Figure 1:
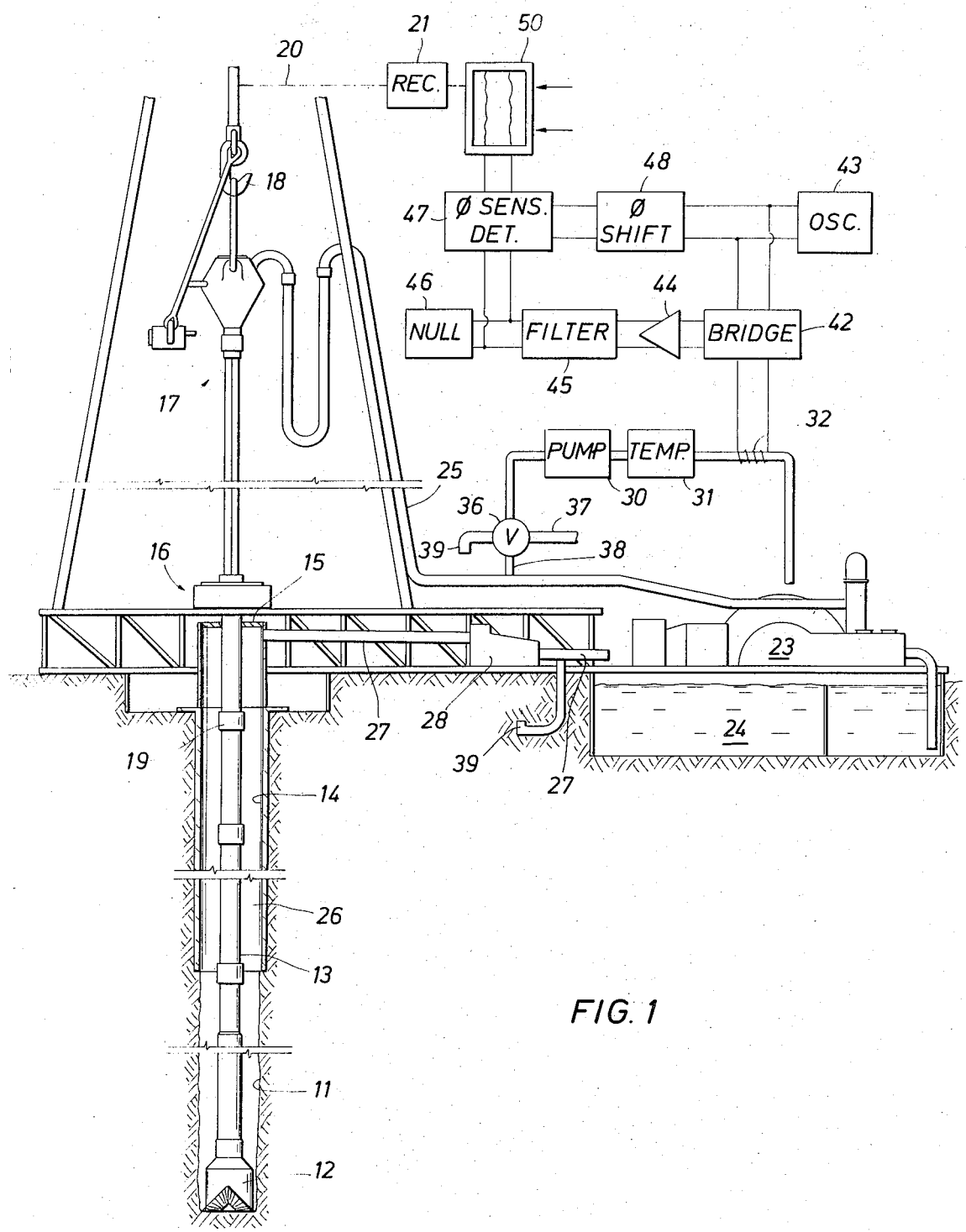

United States Patent [19]

Mazzagatti

[11] 3,831,082

[45] Aug. 20, 1974

[54] MAGNETIC SUSCEPTIBILITY MUD LOG

[75] Inventor: Roy P. Mazzagatti, Bellaire, Tex.

[73] Assignee: Texaco Inc., New York, N.Y.

[22] Filed: Dec. 20, 1971

[21] Appl. No.: 209,837

[52] U.S. Cl............................ 324/5, 73/153, 324/11
[51] Int. Cl. ............................. G01v 3/18, G01v 3/10
[58] Field of Search................ 324/1, 5, 11, 2, 34 S, 324/30; 73/153, 155

[56] References Cited
UNITED STATES PATENTS

| | | | |
|---|---|---|---|
| 1,720,325 | 7/1929 | Hackstaff et al..................... | 324/2 X |
| 2,289,687 | 7/1942 | Stuart................................... | 324/11 |
| 2,358,163 | 9/1944 | Heym............................ | 324/30 R X |
| 2,535,666 | 12/1950 | Broding................................ | 324/5 |
| 2,616,950 | 11/1952 | Terpstra............................ | 324/30 R |
| 2,692,755 | 10/1954 | Nowak............................. | 324/11 X |
| 2,715,450 | 8/1955 | Bliss et al........................... | 73/153 X |
| 2,859,013 | 11/1958 | Peterson............................. | 324/1 X |
| 2,930,967 | 3/1960 | Laird et al.............................. | 324/1 |
| 3,182,735 | 5/1965 | Salimbeni et al................... | 324/1 X |
| 3,534,256 | 10/1970 | Johnson.............................. | 324/34 S |
| 3,665,297 | 5/1972 | Yates................................ | 324/34 S |

FOREIGN PATENTS OR APPLICATIONS

| | | | |
|---|---|---|---|
| 36,659 | 10/1967 | Finland............................ | 324/34 R |
| 48,083 | 2/1964 | Poland............................ | 324/34 FL |

*Primary Examiner*—Gerard R. Strecker
*Attorney, Agent, or Firm*—T. H. Whaley; C. G. Ries

[57] ABSTRACT

Relative to the mud system used in a well drilling operation, a monitoring system is provided from which a log of the magnetic susceptibility of earth formations traversed by a borehole can be obtained. The system employs a mud sampling channel where the flow of mud is temperature stabilized and passed through a sampling coil so that the entrained formation particles can influence the value of the magnetic field induced by a signal generator in the sampling coil by virtue of their magnetic susceptibility. The sampling coil is a part of a bridge detecting system which is driven with a standard excitation signal so that a change in the permeability (or susceptibility) of the material on the interior of the coil produces an output voltage signal. The amplitude of the output voltage signal which is in phase quadrature with the excitation signal is detected by a phase sensitive detector. A corresponding deviation signal is generated by amplifying this voltage signal to drive a clock operated chart recorder. The chart recorder is connected to the traveling block of the drilling rig for producing a depth recording also. Thus, the recorded deviation signal which is indicative of magnetic susceptibility is correlatable in a well-known manner to the drilling depth. Identical systems may be used to monitor the mud input and output to the well, so that a differential value of the magnetic susceptibility signal can be obtained. Reference liquids can also be supplied to the system for obtaining calibration values having known magnetic susceptibilities.

4 Claims, 2 Drawing Figures

MAGNETIC SUSCEPTIBILITY MUD LOG

BACKGROUND OF THE INVENTION

This invention relates to mud logging systems and, more particularly, to a system for logging the magnetic susceptibility of earth formation materials entrained in the mud system during the drilling operation.

In the drilling of a well bore, it is common to use a drilling fluid which is known as "mud." In the typical system where mud is used, a drilling bit is attached to a tubular string of pipe and forms a borehole under the application of weight and rotation. In this process, the mud system is forced down the interior of the drilling string, through the drilling bit, and returns to the surface via the annulus between the drilling string and the borehole. The drilling mud performs an essential function of cooling and lubricating the bit, removing cuttings and providing control pressure within the borehole, as well as a mud cake where necessary for permeable formations. As would be expected, the drilling mud carries back to the surface particles of earth formations as they are drilled or cut by the drilling bit. At the earth's surface, the larger earth cuttings are segregated from the drilling mud by means of a device called a "shaker," and settling tanks are used to permit entrained formation particles to settle out.

The most significant factor of interest during the drilling operation is what type of formations are being traversed by the drill bit. One of the reasons why this is so important is that if the weight of the mud can be controlled, the operation can be more efficiently and inexpensively performed. The control of the weight of mud is dictated by the type of formation encountered. It is also desirable to determine, of course, the presence or absence of hydrocarbons and gas in the underground strata and to determine such locations at a precise depth relative to the surface. There are a great many reliable tools and services available to ascertain parameters of the earth formations relative to a drilled hole, but the number of systems to derive information relative to earth formations while the hole is being drilled is quite limited. For the larger part, most of the significant parameters are obtained by removing the drilling string and conducting a survey with a logging instrument.

Except where the well being drilled is the first or wildcat well, there are in existence a number of adjacently located wells, and there usually is a set or a suite of logs on these wells which can include magnetic susceptibility logs. From the existing well logs and the various production and testing data available, a determination of the geological strata can be made. It is possible, therefore, to correlate magnetic susceptibility characteristics of a particular strata from well to well.

In connection with the present invention, it is intended to be able to correlate, while drilling, the magnetic susceptibility of the earth formations traversed by the drilling bit so that during the drilling operation it is possible to have an indication of the profile of the subsurface strata being penetrated by the new well.

THE PRESENT INVENTION

The present invention contemplates the sampling of input and output mud during the drilling operation on a continuous basis where the sampled flow is stabilized as to temperature. The magnetic susceptibility of the sample (primarily due to entrained earth formation particles in the mud) is determined and correlated on a log which is produced as a function of time and drilling depth. The foregoing is accomplished by means of a sample coil through which the mud sample passes and thereby changes the inductance in the coil. A bridge circuit, which was initially nulled, produces a quadrature signal in response to a change in inductance which is supplied to a phase sensitive detector. The phase sensitive detector compares the quadrature signal to a reference signal, and the comparison signal is functionally related to the magnetic susceptibility in a mud sample. The comparison signal is supplied to a clock operated recording device.

It is accordingly an object of the present invention to provide a new and improved system for the logging of mud flow during a drilling operation for monitoring the magnetic susceptibility of earth formation particles entrained within a mud flow as a function of time and well depth.

Figure 2:
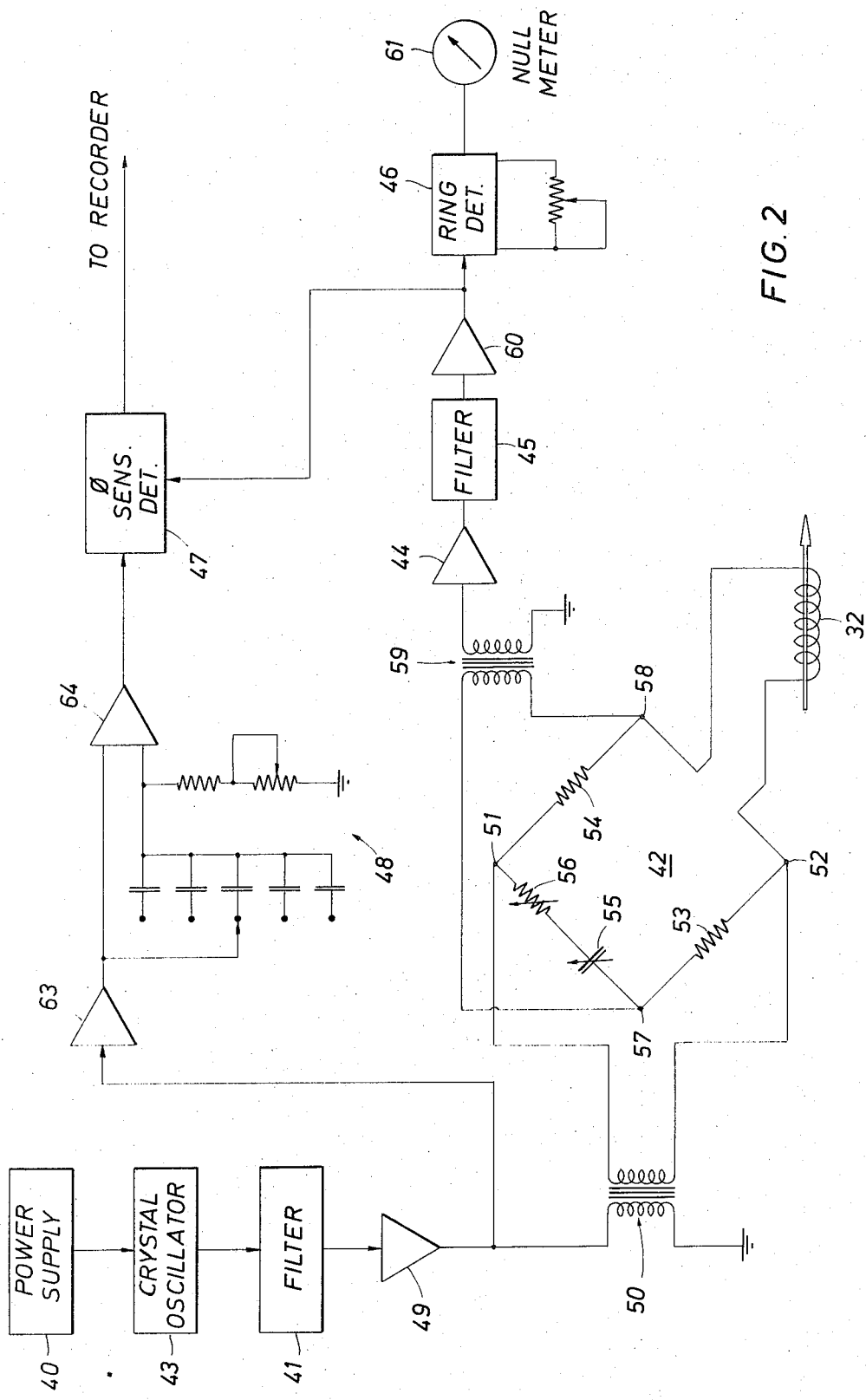

The above objects as well as other objects, advantages and features of the present invention will become more apparent from the detailed description of the invention which follows, and is described in connection with a drawing which illustrates a preferred embodiment of the present invention, and wherein:

FIG. 1 is a schematic illustration of the system embodying the present invention in relation to a drilling operation; and FIG. 2 is a schematic illustration of electronic circuitry embodied in the present invention.

Referring now to FIG. 1, an earth formation is traversed by a borehole 11. To produce the borehole 11, a cutting or grinding bit 12 is attached to a string of tubular drill pipe 13 and rotated while weight is applied to the bit. The section of borehole 11 near the earth's surface typically is cased with a casing or pipe 14 so that just above the earth's surface the drill pipe can be closed off as schematically shown at 15. Driving means are shown at 16 which are disposed on a drilling rig to power the rotation of the drilling bit while the upper end of the drilling string is coupled to a swivel 17 and a tubular driving connection commonly called a "kelly." The swivel 17 is supported by a hook 18 on a traveling block (not shown) on the drilling rig.

The drilling string 13 is comprised of lengths of pipe, usually about 30 feet in length, which are threadedly coupled together by tool joints 19. In the drilling operation, the hook 18 on the drilling rig supports the weight of the drilling string, and the weight applied to the drilling bit 12 is controlled by the hook 18. As the bit penetrates the formations, the hook 18 is moved downwardly. From time to time additional sections of pipe are added to the drilling string just below the swivel and kelly 17 so that the hook can be repositioned in an upper part of the rig for subsequent downward motion. By means of a conventional sensing device, the travel of the block or hook while the pipe is drilling can be recorded so that the depth of the borehole or the length of the drilling pipe can be determined from a recorded 21. In the drawing, the dashed line 20 indicates an interconnection of a sensing means for hook travel to the recorder.

In the drilling of a borehole with a rotary drilling system, it is common to employ a drilling fluid in the drilling process. This drilling fluid is known as "mud," and it should promote safe and speedy drilling. It performs, among other things, the functions of cooling and lubricating the bit and drill pipe, cleaning of the hole bottom, removal of cuttings, formation of impermeable mud cake, and providing pressures in the borehole greater than any formation pressures encountered. As illustrated schematically in FIG. 1, a mud pump 23 draws fresh mud from a mud supply pit 24 and pumps it via a flow line 25 to the swivel 17 and interior of the drilling string. The mud is forced out of the drilling bit 12 and returns to the surface via the annulus 26 between the drilling string and borehole (cased or uncased). At the surface, the casing 14 has an outflow pipe 27 which returns the mud to the pit 24 via a shale shaker 28. It will be appreciated that the mud system illustrated has been highly simplified. Additional elements such as degassers and settling tanks are not shown, as further detail is not necessary for an understanding of the present invention.

In the drilling operation, the calculation of mud volume in the circulating system is readily accomplished. The flow or volume in gallons per minute also is determinable so that with a degree of accuracy it can be determined how much time is required for a discrete amount of mud to travel from the surface to the drilling bit and the time for return of the mud to the surface. In the prior art, a number of systems are available to log the trip time of the mud. As will hereinafter become more apparent, the time of return of mud from the bit will be significant. Another significant fact to the present invention is that the drilling liquid as it returns from the bit 12 to the surface entrains and contains earth formation particles derived from the penetration of the earth formation by the bit.

The earth formations are typically comprised of systems of rocks which were deposited over great periods of time to form the present-day strata. Such rocks and the minerals therein can have measurable magnetic susceptibility. In this regard, the present invention concerns itself with the ability to obtain a continuing measurement of magnetic susceptibility of earth formations as a function of depth in the borehole. Such a record, aside from providing magnetic susceptibility information, also can provide a correlation log between strata having common magnetic susceptibility signatures.

As shown in FIG. 1, there is a first flow line smapling system comprised of a pump 30, a measuring coil 32 and a temperature regulating device 31 which may be separated from the measuring coil 32 if desired. This system is adapted to receive either a control liquid such as water, a sample of the mud input to the well, or a sample of the mud output from the well.

Considering the flow line system, the pump 30 is a relatively surgeless, smooth flow pump such as a Moyno-type which has its input conduit coupled to a three-position valve 36. Valve 36 has a first input 37 which can be a control liquid such as water, a salt water solution or any other desired control liquid, a second input 38 which is coupled to the input conduit 25 for the mud, and a third input 39 which couples to the outflow pipe 27. Dependent upon the position of the flow control element in valve 36, pump 30 can receive either a control or reference liquid, a mud input sample or a mud output sample.

The output of pump 30 is supplied to a temperature regulating means 31 which receives the output for a sufficient period of time to stabilize the temperature of the liquid. This may be accomplished, for example, by means of a tortuous path through a heated or cooled liquid bath. A section of the flow conduit in the control section 31, or adjacent to it, is constructed of glass or other relatively non-magnetic material, and this section has a measuring coil 32 wound around it. The coil 32 should have a length which is great compared to the diameter of the conduit to integrate the effect of the sample mud flow.

The sample or measuring coil 32 is electrically coupled to a bridge circuit 42 as one of the sides of the bridge. Such a bridge circuit, for example, can be a General Radio type 578-A. An oscillator 43 having a frequency in the range of 1,000 to 2,000 hertz is supplied as an excitation A.C. input to the bridge 42. This particular frequency is chosen so as to avoid conductive effects caused by higher frequencies. The output signal from the bridge, which is a function of any imbalancing of the coil 32, is amplified by an amplifier 44 to obtain output values adequate to drive a recorder. A suitable bandpass filter 45 arranged with cutoffs about 200 cps to either side of the frequency response is coupled to the amplifier 44 and provides an output to a null detector 46 and to a phase sensitive detector 47. The phase sensitive detector 47 is also supplied a reference signal from the oscillator 43 which is shifted 90° by a phase shifter circuit 48.

As shown in FIG. 2, the crystal oscillator 43 is powered by a regulated power supply, and its output is passed through a band pass filter 41 to an amplifier 49 and a transformer 50. The transformer winding is coupled to the bridge diagonals 51 and 52. The bridge 42 includes resistance arms 53 and 54, a capacitive arm 55 with a series connected resistance 56 and an inductance arm which includes coil 32. Diagonals 57 and 58 of the bridge are coupled to an output transformer 59 which, in turn, is coupled to the amplifier 44 and bandpass filter 45. The output of filter 45 is again amplified in an amplifier 60 and supplied to a ring detector circuit 46 which provides an output to a null meter 61. As will hereinafter be more fully explained, the null detector is used to balance the bridge conditions as a reference.

To detect the quadrature signal, the potential signals supplied to transformer 50 are also supplied via an amplifier 63 to a phase shifting network 48. As shown in FIG. 2, network 48 is comprised of an RC arrangement where any one of a number of capacitance values can be switched into the circuit, and a potentiometer can vary the resistance. A differential amplifier 64 supplies the phase shifted signal to the phase sensitive detector. The signal is shifted 90° so as to match phase with respect to the quadrature signal from coil 32. The phase sensitive detector 47 is arranged to receive the reference signal from the oscillator 43 and the signal from coil 32 and provide an output signal having an amplitude value representative of the difference between the nulled value and a measured value.

The foregoing description may be more completely understood by reference to definitions. The ratio of the density of magnetic flux $B$ to the effect of a magnetic field $H$ is defined as magnetic permeability $\mu$. The magnetic susceptibility $K$ is also related to magnetic permeability in the following manner:

$$\mu = B/H = 1 + 4\pi K \qquad (1)$$

The magnetic field $H$ for a coil is defined as:

$$H = (4\pi NI)/(\sqrt{1^2 + 4r^2})$$

where 1 is the length of the coil, $r$ is the radius, $N$ is the number of turns per unit length and $I$ is the current. The quadrature signal from coil 32, that is, the voltage signal which is attributable to a change in inductance of the coil, is a function of the magnetic permeability of the core material which, in turn, is related to magnetic susceptibility. Thus, it can be appreciated that entrained particles of formation material passing through coil 32 at a constant temperature will vary the inductance of the coil in relation to the magnetic susceptibility of the particles.

In the operation of the system, valve 36 is operated to admit the control liquid to the system from source 37. By varying the value of capacitor 55 and resistance 56, the bridge can be balanced to indicate a null value on meter 61. At any given time relative to the drilling operation, the depth of the drilling string 13 is indicated on the movable chart or film in the recorder where the chart is moved as a function of time and time markings are also applied. Thus, with a time chart and the depth of the drilling bit, it will be appreciated that the travel time of the mud from the drill bit to the surface is readily determined and the signal determination provided by the phase sensitive detector 47 is recordable as a function of the depth and time.

The valve 36 is then operated to take an input sample of the mud to the coil 32, and the magnetic susceptibility of materials entrained in the mud will produce an output signal to the recorder. An adequate time is permitted to elapse to establish the value for magnetic susceptibility for the input mud. Valve 36 is again operated to take an output sample of the mud when sufficient time has elapsed for the mud first sampled to make the round trip. Thus, the output mud will reflect the addition of magnetic susceptibility attributable to earth materials drilled by the drilling bit. The difference between the magnetic susceptibility of input and output muds is due to materials picked up during the drilling operation.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method of logging the magnetic susceptibility of earth formations traversed by a well borehole during a well drilling operation of the borehole by measuring the magnetic susceptibility changes of the drilling fluid being circulated in the drilling process caused by entrained particulate matter from the earth formations being penetrated by the drill bit, comprising the steps of:

circulating drilling fluid through a drill string, a drill bit and the annulus between the drill string and the borehole wall while drilling a well bore;

diverting a continuously flowing sample of the return circulation of the drilling fluid into a measurement apparatus;

stabilizing the temperature of the diverted portion of said return circulation of said drilling fluid to form a temperature stabilized measurement sample flow;

passing said temperature stabilized measurement sample flow through a coil forming one leg of a balanced bridge electrical circuit;

driving said balanced bridge electrical circuit with an alternating current reference excitation signal; and detecting the amplitude of any component of an alternating current output signal from said bridge circuit which is in phase quadrature with said reference excitation signal due to changes in the permeability of said coil caused by entrained particulate matter in said temperature stabilized measurement sample flow to derive a signal representative of the magnetic susceptibility of such entrained particulate matter in said temperature stabilized measurement sample flow.

2. The method of claim 1 and further including the step of recording said representative magnetic susceptibility signal as a function of the depth of the borehole being drilled.

3. The method of claim 1 and further including the step of recording said representative magnetic susceptibility signal as a function of time.

4. The method of claim 1 and further including the step of, prior to making a magnetic susceptibility measurement of said temperature stabilized measurement sample flow of said drilling fluid:

passing a temperature stabilized flow of a control fluid of known magnetic susceptibility properties through said coil for a period of time sufficient to alter the permeability characteristic of said coil in a manner functionally related to the magnetic susceptibility of said control fluid, to thereby calibrate said measurement apparatus.

* * * * *